INVENTOR
Rudolf W. Altmann
By
[signature]
Patent Agent

FACIAL SHOWERING DEVICE

Filed June 24, 1959 4 Sheets-Sheet 2

INVENTOR

Rudolf W. Altmann

By

Patent Agent

FACIAL SHOWERING DEVICE
Filed June 24, 1959 
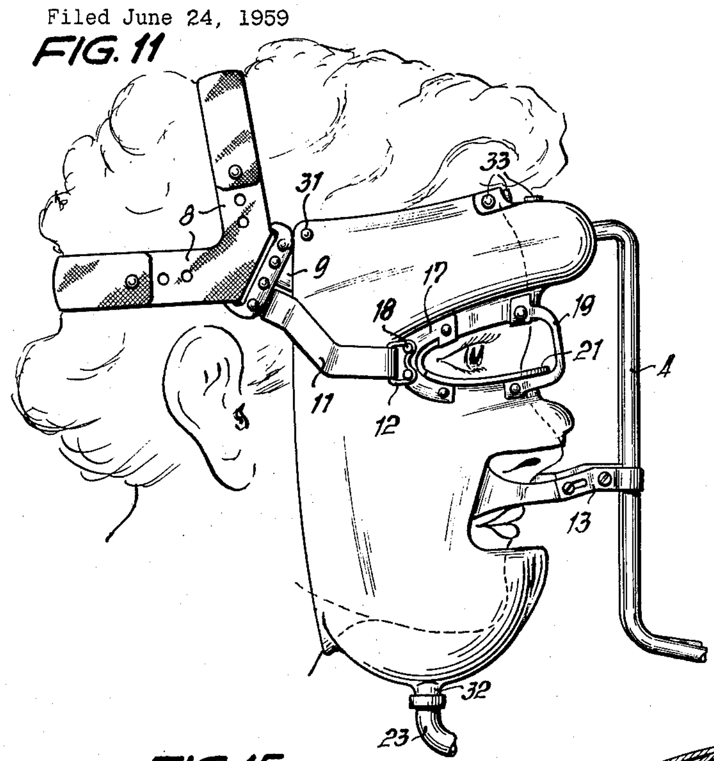
FIG. 12
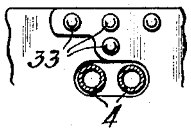
FIG. 14
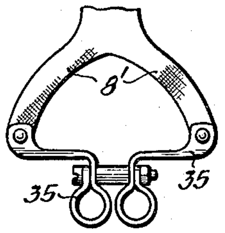
FIG. 15
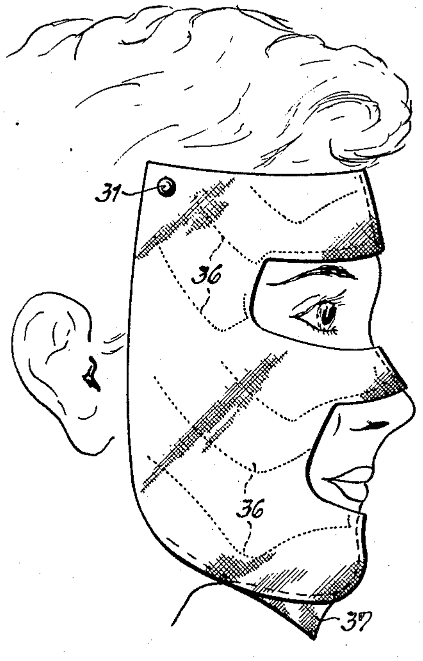
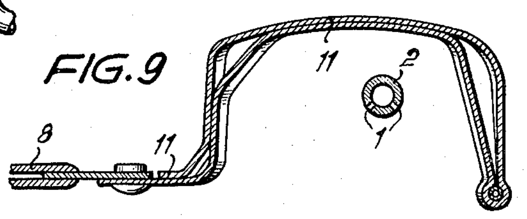
FIG. 13
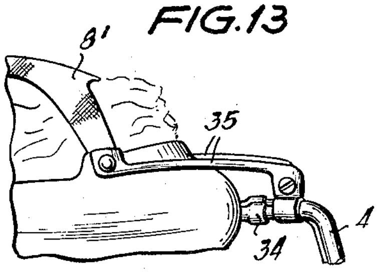
INVENTOR
Rudolf W. Altmann
By [signature]
Patent Agent

FACIAL SHOWERING DEVICE

Filed June 24, 1959 4 Sheets-Sheet 4

INVENTOR.
Rudolf W. Altmann
BY
[signature]
Patent Agent 3,045,669
Patented July 24, 1962

3,045,669

FACIAL SHOWERING DEVICE

Rudolf W. Altmann, Calle Wisconsin 62, Mexico City, Mexico

Filed June 24, 1959, Ser. No. 822,681
7 Claims. (Cl. 128—66)

The present invention relates to an apparatus for self-applying facial baths and packs. This application is a continuation-in-part application of my co-pending application Ser. No. 772,105 filed November 5, 1958, and now abandoned.

Heretofore it was not possible to treat the face by a continuous bath and subject the face to treatment methods of balneology. In other words, it was not possible heretofore to subject the face to an intensive uninterrupted flow of water nor to a methodically wetting for the purpose of producing a strong flow of blood through the facial parts, because any continuous uninterrupted flow of water interfered with normal breathing and also with vision. Furthermore, it was not possible heretofore to self-apply facial packs nor replace the loss in moisture and temperature of towels applied to the face of a person without removing such towels.

It is, therefore, an object of the present invention to provide an apparatus for self-applying facial baths with a continuous flow of warm and/or cold water without affecting the breathing and vision of the person treating herself.

It is another object of this invention to provide an apparatus of the above mentioned type, which will make it possible for the person treating herself fully to control the application and the change of warm and cold water so as to selectively adjust the flow and temperature of the water being applied to the face.

It is also an object of this invention to provide an apparatus for self-applying facial baths which will make it possible to wet the face over a longer period of time at variable water temperatures and selectively, either suddenly or slowly to change from warm to cold water and vice versa while controlling the flow of water so as to produce a stronger or weaker massaging effect.

A further object of the present invention consists in the provision of a face treatment apparatus of the above mentioned type which will make it possible to subject the face to the treatment of warm water while preventing the access of air from the outside, and to allow the temperature of the water fully to act upon the face and to substantially maintain the temperature of the facial skin for a longer period of time even though the flow of water may be interrupted.

A still further object of the present invention consists in the provision of an apparatus of the above mentioned type, which will also make it possible to admix such ingredients to the flow of water continuously acting upon the face, which may have a beneficial effect on the face.

Still another object of the present invention consists in the provision of an apparatus which will allow application of facial packs on the face and the humidification of same to a greater or less extent, in conformity with the desired purpose while the loss in humidity and temperature of the particular pack can be compensated for without removing the pack.

A still further object of the present invention consists in providing an apparatus of the above described character, which will allow the head of the person using the apparatus to rest in any convenient position.

It is still another object of this invention to provide a device for self-applying a facial bath, which, instead of being worn on a person's face, may be suspended over a sink and allows the person to massage her face with her hands.

These and other objects and advantages of the invention will appear more clearly from the following specification in connection with the accompanying drawings, in which:

FIG. 4 is a side view of an apparatus according to the invention as placed upon the face of a person and equipped with vision and breathing protector.

FIG. 5 is a front view of the vision protector.

FIG. 6 is a section along the line VI—VI of FIG. 5.

FIG. 7 illustrates holding members which may be employed when the apparatus is manually held against the face instead of by straps or the like.

FIG. 8 is a section through an adjustable temple holder for use in connection with the apparatus according to the invention.

FIG. 9 is an inclined section of a holding device for the vision protector.

FIG. 10 shows partially in section and partially in view a holding device for the breathing protector.

FIG. 11 illustrates a side view of an apparatus according to the invention provided with a mask of rubber or similar material as applied in connection with facial baths.

FIG. 12 is a top view of the upper portion of the mask shown in FIG. 11.

FIG. 13 is a side view of a forehead portion of a mask somewhat modified over that of FIG. 11.

FIG. 14 is a front view of the holder shown in FIG. 13.

FIG. 15 shows a mask of fabric for use in connection with the present invention.

*General Arrangement*

Figure 1:
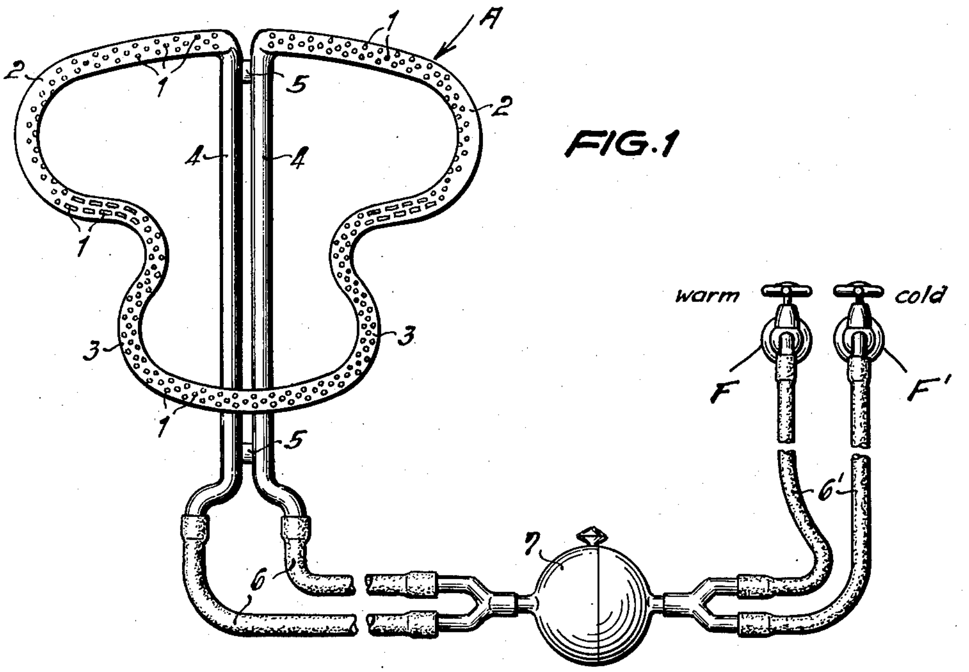
FIG. 1 illustrates the pipe system of an apparatus according to the present invention including that portion thereof which is adjacent the face in slightly spaced relationship thereto and is provided with apertures for directing the flow of water against the face.

The apparatus according to the present invention consists primarily of a frame construction including a perforated pipe section having a shape generally conforming to the natural contour of the face, and may be made of metal or non-metal or hose material including perforated hose sections. The apparatus according to the invention furthermore comprises a vision protector and a breathing protector to allow the carrying out of simple facial baths. When special facial baths are to be applied, the apparatus according to the invention also includes a mask which may be of rubber or other suitable material. The arrangement according to the present invention includes a fabric mask for applying facial packs.

The frame construction may be supplied with hot and cold water and conveys said water to the face. The arrangement is such that the water may be applied and guided properly to the facial area to be treated and will be directed in such a way that the water flow or water jets will have a maximum effect upon the facial skin, while the water is kept away from the eyes and the breathing openings in the nose so that an unimpeded breathing and vision will be assured while on the other hand the respective facial parts are impinged upon by the water at a maximum intensity and properly wetted.

The frame construction of the apparatus comprises interconnected frame portions, namely a forehead portion, a mouth portion, and two water feeding pipes leading to the face frame portion, by means of which the water jets are directed upon the forehead, temples and lower eye portions as well as upon the rear cheek portions, whereas the mouth frame portion directs the water jets upon the chin and front cheek portions. The frame construction is preferably held by means of adjustable holders against the face in slightly spaced relationship thereto, for instance at a distance of ⅘ of an inch to 1 inch so that also at different rates of water flow, substantially the same area of the face will be impinged upon by the water jets.

The upper frame portion extends in slightly spaced relationship to and around the eyes and over the forehead portion and temple portion of the face and also extends over the lower eye portion. This arrangement will prevent those water jets intended to be directed to the forehead from hitting the eyes when the force of the water flow is reduced. In order furthermore to prevent the eyes from being sprayed at the instant when the water is turned on and the water flow begins to contact the face, the ledge-like portion of the vision protector is above the eyes provided with a roof-like inclined surface. Furthermore, for assuring unimpeded breathing, the mouth frame portion extends in slightly spaced relationship over the nose and around the mouth. It will thus be obvious that the forehead, temples and lower eye and chin areas, the skin of which areas has the tendency to sag first, will be hit by water jets over a short distance and at a maximum massaging effect, whereas the sprinkling of the cheek portions up to the ears will be effected by longer water jets. The wetting and sprinkling of the various facial parts is effected by corresponding arrangement of the perforations or apertures in the frame construction and by correspondingly shaping said perforations or apertures which may have the shape of round or oblong holes of respectively smaller or larger dimensions. Inasmuch as the water is under pressure and inasmuch as the respective pipe portion of the frame has a diameter considerably larger than the adjacent perforation, and since furthermore the water coming from both sides will meet in the central portion of the mouth frame portion, the discharged water jets will not affect the water pressure in the frame construction, in other words, no pressure drop is present. The water jets leaving the frame construction, therefore, are in conformity with the higher water pressure prevailing everywhere in the frame construction. The pressure differences which may exist in the frame construction are of such minor magnitude that they are negligible for all practical purposes.

The feeding pipes for conveying the water to the face have fixedly connected thereto two mouth holders to which the breathing protector is connected. These mouth holders hold the inner marginal portions of the breathing protector under pressure against the face. This pressure against the face is brought about by a lever movement caused by a temple holder and by other features of the frame construction. The temple holders which are firmly mounted on pipe sections parallel to the face frame portion, are movably connected to the sides of the head strap holding device. In this way, a pivot is created, whereas the entire frame construction acts as a lever so that by its weight in combination with the weight of the suspended feeding hoses over the mouth holder, the inner marginal portions of the breathing protector are pressed against the face from the lower nose portions up to behind the mouth angles. The adjustability of the mouth holder in combination with that of the temple holder makes it possible to hold the frame construction at a proper distance from the face.

The apparatus according to the present invention also may be provided with an adjustable head strap with holding device and a water tray adapted to be mounted on the feeding conduits. Moreover, the device according to the invention may be equipped with a mixing control to be arranged between the feeding conduits and adapted to receive and control ingredients to be admixed to the water. The head strap above referred to is adapted to hold the apparatus against the face so that the hands will be free and by means of valves or the like can control the water flow, the water temperature and the change from warm to cold water and vice versa.

According to a modification of the invention, a frame structure similar to that of FIG. 1 is instead of being worn in form of a mask made suspendable, for instance over a sink, while the tubular portion of the frame with the apertures through which the water passes occupies a substantially horizontal position. With this device, the person bends over the tubular frame structure and has her hands free to massage her face while the water jets hit the face.

*Structural Arrangement*

Referring now to the drawings in detail, and FIG. 1 thereof in particular, the frame construction shown therein comprises a tubular portion generally designated A which comprises a perforated section with the perforations or outlet apertures 1 through which the warm and cold water passes in form of jets and hits against the face. The frame construction further comprises the forehead frame portion 2 and the mouth frame portion 3 and in addition thereto comprises two feeding pipes 4 which are not provided with perforations and are preferably interconnected any convenient connecting members 5. As will be seen from FIG. 1, the feeding pipes 4 communicate with the perforated sections 2. It is, of course to be understood that instead of two feeding pipes 4, there may be provided a single accordingly wider feeding tube. The perforated section 2 may also be replaced by a plurality of perforated pipe or hose sections which may be so dimensioned as to diameter and perforations as to assure a uniform water jet pressure or a certain water jet pressure over one facial area and a different water jet pressure over another facial area as the case may be. Depending on the dimensions of the perforations and their arrangement in the frame construction directional control and dispersion of the water jets will be obtained.

The tubes 4 have connected thereto inlet hoses 6 which lead to a controllable mixing device 7 of any standard type. The mixing device 7, which in its simplest form may consist of a housing with perforated partitions or guiding walls, is adapted to be filled at least in part with ingredients which may have a beneficial skin treating effect. The warm and cold water which may be drawn from a warm water faucet F and a cold water faucet F′, passes through hoses 6′ into the mixer 7 where the warm water and the cold water will be mixed with each other and with the ingredients in the mixer 7.

Figure 2:
FIG. 2 shows a vision and breathing protector for use in connection with an apparatus according to the invention as applied to the face of a person for treatment of the facial skin.

FIG. 2 shows a vision protector and a breathing protector as they may be used in connection wtih the apparatus according to the present invention.

The principle of said vision and breathing protector consists primarily in means conforming generally to the natural contours of the face, which will prevent the water running down the forehead portion from flowing over the eyes and will also prevent the water running around the nasal and cheek portions from flowing over the mouth and the nose openings. The vision protector may, of course, also be designed similar to a spectacle frame (but without glasses) so that water from the central portions of the forehead can flow off over the nose portions of the spectacle frame shaped vision protector. The said vision and breathing protectors will be described further below in connection with FIG. 4.

Figure 3:
FIG. 3 is a top view of the breathing protector, in particular the upper portion thereof to be placed upon the nose.

The breathing protector and, in particular, the shape of the upper portion thereof to be placed upon the nose, is particularly clearly shown in FIG. 3.

Figures 4, 5, 6, 7, 8, 10:
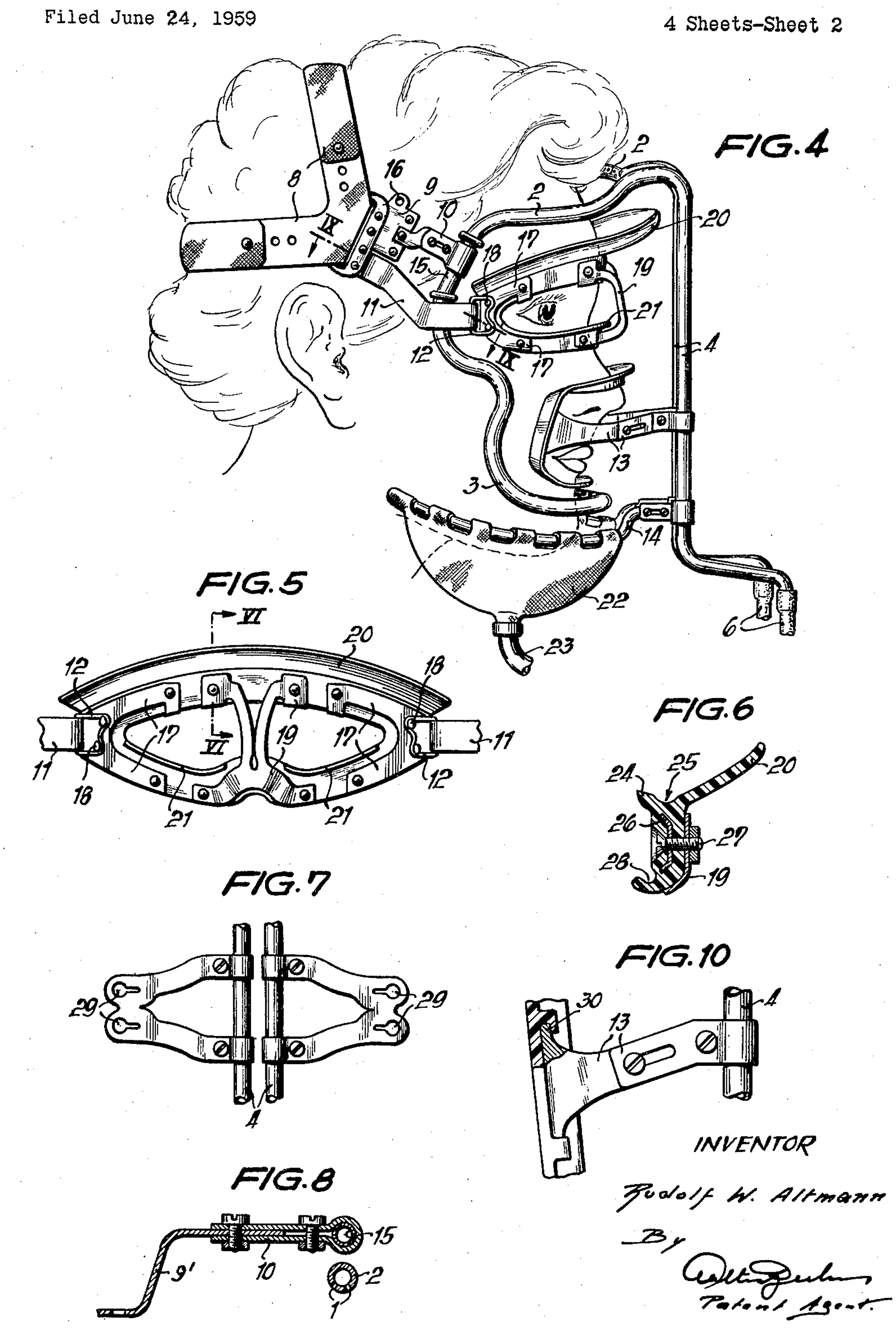

Referring now to FIG. 4 showing a side view of an apparatus according to the invention, equipped with vision and breathing protector and placed upon the face of a person, it will be seen that the apparatus is equipped with an adjustable head strap 8 which in its turn is connected to a holder 9 having connected thereto a temple member 10 and a holder 11 with a holding hook 12 for the vision protector. The apparatus furthermore comprises two mouth holders 13 mounted on the feeding pipes 4, and a water collector 14 likewise connected to and supported by the feeding pipes 4.

The adjustable and detachable temple member 10 on each side of the device supports the apparatus inasmuch as it is fixedly connected to the pipe section 15 and is movably connected to the holder 9. In this way, a pivot is formed and the rigid frame construction will in the manner of a lever due to its weight and the weight of the feeding hoses press the breathing protector firmly against the face, namely through the intervention of the two adjustable mouth holders 13 firmly connected to the feeding pipes 4.

The breathing protector is connected to the mouth holders 13 as is particularly clearly shown in FIG. 10. The mouth holders press the inner marginal portion of the breathing protector against the face from the lower lateral nose portion up to the mouth angle whereby a pull is exerted upon that portion of the breathing protector which rests on the back of the nose so that the breathing protector is firmly held in its position. The holder 9 has an ear 16 for connection with the rubber mask as shown in FIGS. 11 and 13 or the fabric mask as shown in FIG. 15.

The vision protector comprises angular members 17 of metal or other suitable material. Each angular member 17 is provided with holding buttons 18. The holding hook 12 catches behind the holding buttons 18 whereby the vision protector is subjected to tension and held against the face of the person wearing the apparatus. Although the vision protector is shaped in conformity with the human forehead, the holder 12 serves so to speak as safety holder for maintaining the shape of the vision protector, and furthermore has the purpose of maintaining the vision protector in proper position above the eyes. The marginal broadened inclined surface 20 of the vision protector is so wide that when turning on the water, and when the latter begins to flow, the eyes will be properly protected. That portion of the vision protector which is located below the eyes has a broadened portion 21 to protect the eyes against water jets from below and does not have to be pressed upon the face as firmly as the upper portion 20 which, as mentioned above, catches the water running from the forehead and deviates this water toward the sides. The water tray 14 is adjustable and can easily be mounted on the feeding pipes 4. The water catching portion 22 which may consist of a rubberlike material and may rest upon the neck, has connected thereto a discharge hose 23. The apparatus may also be used without water collector 22, inasmuch as it will suffice slightly to incline the head foreward in order to assure that the water will run down the face to the chin and run off or drop off from the latter.

Referring now to FIG. 5, this figure illustrating a front view of the vision protector, also clearly shows how the sides of the vision protector are connected to the holding hooks 12 holding the vision protector tightly against the face. The framework of the vision protector is so designed that it will yield when the upper portion of the vision protector is subjected to pull and firmly held against the eyebrows. While it is not necessary that the vision protector is provided with glasses, it is, of course, also possible to do so. As shown in the drawings, the vision protector does not require any glasses inasmuch as the water is channelled away from the eyes. Since no glasses are required, there will, of course, be no problem of glasses fogging.

FIG. 6 which represents a section along the line VI—VI of FIG. 5, clearly shows the connection of the various elements of the vision protector and in particular that portion thereof which rests upon the face above the eyes. It also shows the protruding portion 24 which will rest on the forehead and catches the water running down the forehead. This water is caught in the trough 25 and conveyed to both sides of the vision protector. The member 26 serves as counter bearing for the connection of the holder 19 by means of a screw 27. Similar counter members are provided for the angular pieces 17 including the holding buttons 18, while angular elements, preferably with roughened surfaces, rest on or in the vision protector material. The groove 28 which, when the vision protector is mounted on the face, is located above the eyes, merely serves as additional safety measure for catching any possible smallest amount of water which might have trickled through.

FIG. 7 shows two holders which are mounted upon the feeding pipes 4 at about the level of the eyes if the apparatus is manually held against the face and no head band is to be employed. In this instance, the holding buttons 18 of the angular member 17 engage the ears 29 whereby the vision protector will be firmly held against the face in about the same manner as if a head band were employed. To this end, a slight pressure is exerted by hand upon the apparatus, i.e. the vision protector and the breathing protector, which pressure is then conveyed to the somewhat elastic holders in such a way that the latter will press the angular pieces 17 upon the face and to the sides thereof.

The adjustable temple holder 10 referred to in connection with the description of FIG. 4 is shown on a somewhat larger scale in FIG. 8. This temple holder 10 is firmly mounted on a pipe section 15 which is substantially parallel to the pipe of the frame. The frame is provided with apertures or perforations 1.

FIG. 9 illustrates on a somewhat larger scale than FIG. 4 an inclined section through the holder 11 for the vision protector and also indicates that the holder 11 extends above the pipe of the frame section 2. FIG. 9 also shows the perforations 1 and a portion of the head strap 8.

A further detail of the frame according to the present invention, namely the connection of the mouth holder 13 on the inner marginal portion of the elastic breathing protector, is shown partly in section in FIG. 10. In order to insert the nose-like holding ends 30 into the pocket-shaped recesses of the breathing protector, the breathing protector is slightly spread.

Referring now to FIG. 11, this figure shows in side view a rubber mask which is employed in connection with facial baths. This mask has cut-outs in the lower portion of the nose section, the mouth section and also the eye section so as not to interfere with the breathing and the vision of the person employing the bath. The said rubber mask is employed in particular with facial baths during which a maximum of water is to be applied and very strong water jets are to be employed in order to obtain a maximum massaging effect. Such rubber mask may furthermore be employed in connection with facial baths in which a direct access of air from the outside is to be prevented in order to maintain the temperature of the water during the bath and to maintain the temperature on the face after the warm water supply has been cut off so that the facial skin will transpire over a longer period of time.

As will be seen from FIG. 11, the rubber mask is hollow and encloses the face only along the reinforced marginal portions of the mask so that a hollow space will be formed over the face. It is in this hollow space that the frame construction of the apparatus will then be located which by means of the temple holder (likewise arranged in said hollow space) and the mouth holder 13 will be held at the proper distance from the face so that the flow of the water jets will not be impeded. The feeding pipes 4 are arranged outside the mask and, as shown in FIG. 12, pass through the forehead portion of the mask. The marginal portions of the cut-outs for the eyes, the lower nose portion and the mouth have the same features as the vision and breathing protectors illustrated in FIGS 2 to 6, and guide the water on the inside toward the sides of the face where it flows over the cheeks. The marginal portions of the cut-outs are likewise pressed against the face, namely by the holder 11 with the hooks 12 and by the mouth holder 13.

Each side of the rubber mask is connected by means of a screw or button 31 to the ears 16 (FIG. 4) of the holding devices 9 whereby the outer marginal portions of the mask are firmly seated on the face. The chin portion of the mask has a discharge connection 32 and for this reason has some portions reinforced or stiffened. The discharge connection 32 may be connected with the discharge hose 23. The upper forehead portion of the rubber mask is shown in FIG. 12. As will be seen from FIG. 12, closing buttons, preferably in form of snaps 33, are provided for closing and opening this portion of the mask to allow the introduction of the feeding pipes 4 upon the frame construction of the device when the mask is being applied to the face.

FIG. 13 shows in lateral view the forehead portion of a modified rubber mask mounted on the face of a person. This rubber mask differs from that of FIG. 11 in that instead of the forehead rigid frame member and mouth frame member, a perforated hose 34 or flexible pipe is employed for receiving and discharging the water, said perforated hose 34 or flexible pipe adhere to the inner side of the mask in conformity with the shape of the frame and pass through the forehead portion of the mask. The said hose 34 or flexible pipe is connected to the feeding pipes 4 which are firmly mounted in the frame 35. The mask material is therefore considerably stronger and less elastic than the mask material of FIG. 11.

The frame 35 shown in FIG. 13 is shown in front view in FIG. 14. As will be seen from the latter, the two holding arms of the frame 35 are movably connected to an additional head band 8' whereby a lever effect as indicated above is produced and the mouth holder will press upon the face the inner marginal portion of the cut-out for the breathing.

FIG. 15 illustrates in side view the fabric mask and also shows how such mask which consists of a plurality of fabric layers, rests upon the face. Such fabric mask is employed in connection with facial packs. In order to allow an unimpeded vision and breathing, the mask of FIG. 15 is likewise provided with cut-outs around the eye portion, the nose portion and also the mouth portion. The mask is connected to ear 16 (FIG. 4) of the holder 9 by means of holding buttons 31. If the fabric is to be maintained highly humid, the apparatus with vision and breathing protector is placed about the mask. The water jets leaving the frame construction will then hit upon the fabric so as to moisten the same and thereby also the face. The flow of water will in this instance not be an uninterrupted one but will be effected merely from time to time in order to maintain or create the proper degree of humidity and the desired temperature. When facial packs are employed, in which instance the fabric has primarily to maintain a continuous higher temperature and is to be less humid, it will suffice manually to hold the vision protector and frame construction against the fabric mask merely during the temporary supplementing short supply of water. In this instance it will not be necessary to use the breathing protector because the relatively low humidity in the cohesive fabric remains and there is no danger of water running over the tip of the nose and the mouth. The outer fabric layers are provided with seams 36 forming pockets so that ingredients may be inserted in said pockets which will dissolve by the moisture and will thus act upon the facial skin. Also if ice packs are applied, small ice pieces may be inserted in said pockets. Inasmuch as such ice packs have a highly intensive effect, they are employed over a very short period of time only. The fabric mask may furthermore below the chin be provided with a lobe-shaped portion 37 whereby excessive water may collect and drip off.

Figure 16:
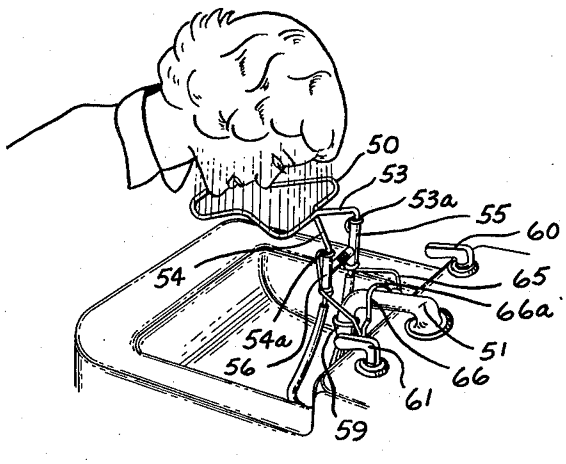
FIG. 16 illustrates a modified and simplified apparatus according to the invention as attached to a faucet.
Figure 18:
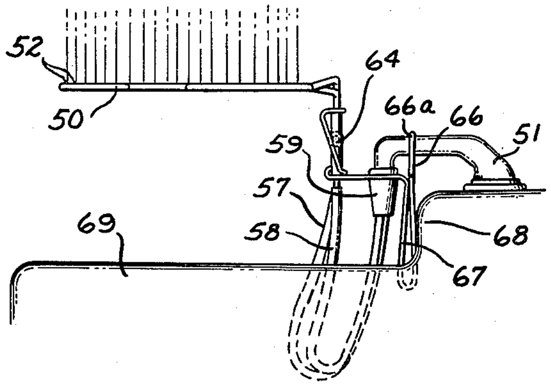
FIG. 18 is a side view of the apparatus of FIG. 17.
Figure 17:
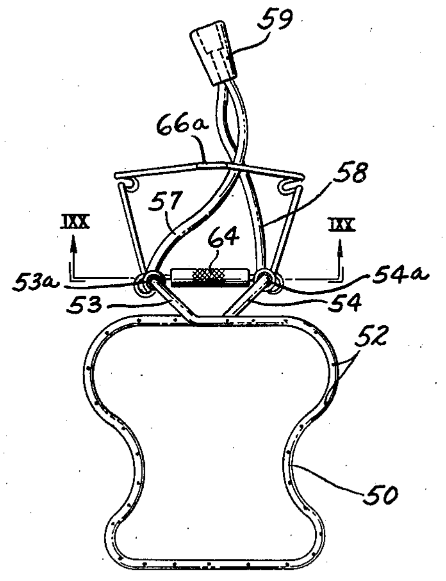
FIG. 17 is a top view of the modified apparatus of FIG. 16.

Referring now to FIGS. 16 to 18, these figures illustrate a modified and simplified apparatus for self-applying facial baths. The device as shown in FIGS. 16 and 17 comprises a tubular frame 50 the general shape of which is similar to the tubular frame construction A of FIG. 1. However, in contrast to the arrangement of FIG. 1, the frame 50 does not form part of a mask but instead is adapted to be mounted on a faucet 51 as shown in FIG. 16. More specifically, the frame 50 is provided along its entire length with small apertures 52 which may be straight or slightly inclined upwardly toward the interior of the frame so that when the water is passed through the tubular frame, the individual water jets will be directed straight or slightly inclined upwardly toward the face which is held above frame 50 as clearly shown in FIG. 16.

Frame 50 is provided with legs 53, 54 which cross each other and have downwardly bent extensions **53*a*, 54*a* which extend into sleeves 55, 56. The lower ends of the extensions 53*a*, 54*a* have connected thereto one end of hoses 57, 58 respectively the other ends of which combine in a mouth piece 59 which is adapted to be slipped upon or connected to the mouth of the faucet 51. It will be appreciated that if the water is turned on by actuating the warm water handle 60 or the cold water handle 61 or both handles, the water from the faucet 51 will enter the hoses 57, 58 and will escape through the apertures 52. By lowering the face of the person intending to take a facial bath more or less, the impact of the water jets upon the face may be varied. The person taking the facial bath and having her face above the frame 50 has no difficulty to breathe nor to see since the water jets hit the face laterally of the eyes, the nose and the mouth. It will also be appreciated that the person taking the facial bath is able easily to reach the handles 60, 61** and to adjust the temperature of the water in conformity with her wishes. Thus, she might want to switch alternately from hot to cold water or she might want to vary the temperature of the mixture of the hot and cold water. Furthermore, the person taking the facial bath has her hands completely free so that she can give herself a massage whenever desired.

Figure 19:
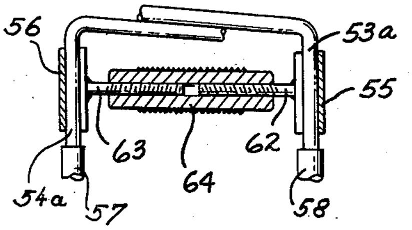
FIG. 19 shows an adjustment mechanism for varying the contour of the frame of the apparatus of FIG. 17.

Inasmuch as the contours of faces vary and, therefore, it is desired to vary the contour of the tubular frame 50 accordingly, the arrangement shown in FIGS. 16 and 17 is provided with an adjusting device shown in particular in FIG. 19.

As will be seen from FIG. 19, each of the sleeves 55, 56 is provided at its inner portion with an inwardly directed threaded stud 62, 63 respectively. Of these threaded studs 62, 63 one stud is provided with right-hand thread whereas the other stud is provided with left-hand thread. The said two studs 62, 63 are threadedly engaged by a correspondingly threaded sleeve-like nut 64 so that a turning movement of nut 64 in one direction will spread apart the legs **53*a*, 54*a*, whereas a turning movement of nut 64 in opposite direction will pull the legs together. Inasmuch as the tubular frame is made of relatively flexible tubular material, as for instance brass, aluminum, or other metal, the frame can easily be pulled apart or together without the danger of breaking it. It will thus be seen that the tubular frame 50 with the apertures 52** therein can easily be adjusted in conformity with the contour of the face of the person desiring the facial bath.

As will be seen from FIG. 16, the sleeves 55, 56 have fastened thereto a holding member generally designated with the reference numeral 65 for instance in form of a wire which has a central hanger-like section 66 (FIG. 18) fitting over the faucet. At the end of said central hanger-like section 66 there are legs 67 on each side thereof which legs normally rest against the elevated wall 68 of the sink 69. It will thus be evident that when the device according to the invention by means of the central section 66 is placed upon the horizontal portion of the faucet 51 so that the legs 67 rest against the wall 68, the device is in proper position in which the tubular frame 50 is located in a substantially horizontal plane. If desired, the round portion **66*a* may be covered with a short rubber hose or other anti-slip material so that the said bent portion 66*a*** will not slip on the faucet.

It is, of course, to be understood that the present invention is, by no means, limited to the particular constructions shown in the drawings but also comprises any modifications within the scope of the appended claims.

Thus, the shape of the tubular frame may also vary over the shape shown in the drawings in conformity with the area of the face which is particularly to be subjected to the impact of the water jets from said tubular frame.

What I claim is:

1. In an apparatus for applying a facial bath: a tubular frame structure of a contour broadly following the contour of a human face and provided with a series of small apertures extending in upward direction only for passing water from the interior of said frame structure through said apertures in the form of thin water jets, said frame structure having two open ends adapted to be connected to water supply means and adjustable relative to each other to thereby vary the contour of said frame structure in conformity with the respective face contour of the person to take a facial bath, holding means connected to said tubular frame structure for holding the same over a wash sink.

2. An arrangement according to claim 1, in which the apertures provided in oppositely located sections of the frame structure are slightly inclined toward each other.

3. In an apparatus for applying a facial bath: a tubular frame structure of a contour broadly following the contour of a human face and provided with a series of small apertures extending in upward direction for passing water from the interior of said frame structure through said apertures in the form of thin water jets, said frame structure having two open ends adapted to be connected to water supply means and adjustable relative to each other to thereby vary the contour of said frame structure in conformity with the respective face contour of the person to take a facial bath, holding means connected to said tubular frame structure for holding the same over a sink, flexible conduit means connected to said tubular frame structure and connectable to a water supply line for conveying water from said faucet into said frame structure, and means connected to said frame structure near said two ends thereof and operable selectively to vary the form of said frame structure to thereby adapt said frame structure to broader or narrower human faces.

4. In an apparatus for applying a facial bath: a tubular frame structure of a contour broadly following the contour of a human face and provided with a series of small apertures extending in upward direction only for passing water from the interior of said frame structure through said apertures in the form of thin water jets, said frame structure having two open ends adapted to be connected to water supply means and adjustable relative to each other to thereby vary the contour of said frame structure in conformity with the respective face contour of the person to take a facial bath, holding means connected to said tubular frame structure for mounting the same over a sink, and conduit means connected to said open ends of said tubular frame structure and connectable to a water supply line for conveying water from said faucet into said frame structure, said holding means including a hanger-like portion having a central inverted U-shaped portion resting on the top of the faucet and also including leg portions for resting against that wall portion of a sink which is adjacent the mouth of the faucet.

5. In an apparatus for applying a facial bath: a single tube bent into a loop with the ends of said loop crossing each other and bent so as to form two legs open at their ends and spaced from each other, said looped portion having the contour broadly following the contour of a human face and being provided with small bores extending at the upper surface only of said looped portion for passing water therethrough in the form of thin jets, adjusting means interposed between said legs and operable selectively to pull said legs together or to spread the same apart, conduit means having one end thereof connected to said open ends of said legs and having the other ends connectable to a water supply line, and holding means connected to said legs for suspending said device over a sink.

6. An arrangement according to claim 5, in which said adjusting means comprises two aligned studs engaging said legs and provided with oppositely located threads and an adjustable nut with left-hand and right-hand thread and threadedly engaging said threaded studs.

7. In an apparatus for applying a facial bath: a tubular frame structure of a contour broadly following the contour of a human face and provided with a series of small apertures, said frame structure having two open ends adapted to be connected to water supply means and adjustable relative to each other to thereby vary the contour of said frame structure in conformity with the respective face contour of the person to take a facial bath, means connected to said frame structure and connectable to a water supply line, holding means connected to said frame structure and connectable to a sink for selectively placing said frame structure over a sink into its operative position in which said frame structure is so located that all of said apertures extend upwardly only for passing water admitted to the interior of said frame structure in the form of jets in upward direction only.

References Cited in the file of this patent

UNITED STATES PATENTS

| | | |
|---|---|---|
| 686,670 | Fitzgerald | Nov. 12, 1901 |
| 1,448,975 | Nenonen | Mar. 20, 1923 |
| 1,795,329 | Coletti | Mar. 10, 1931 |
| 1,970,013 | Mahmourian | Aug. 14, 1934 |
| 2,032,898 | Wilson | Mar. 3, 1936 |
| 2,380,665 | Morris | July 31, 1945 |
| 2,632,179 | Trotter | Mar. 24, 1953 |
| 2,775,774 | Logan | Jan. 1, 1957 |

FOREIGN PATENTS

| | | |
|---|---|---|
| 278,767 | Switzerland | Feb. 1, 1952 |